(12) United States Patent
Florindez

(10) Patent No.: US 10,772,337 B2
(45) Date of Patent: Sep. 15, 2020

(54) PRODUCT MULTIPLYING SYSTEM AND METHOD OF MULTIPLYING A PRODUCT

(71) Applicant: Stewart Systems Baking, LLC, Plano, TX (US)

(72) Inventor: Augusto Florindez, Plano, TX (US)

(73) Assignee: STEWART SYSTEMS BAKING, LLC, Plano, TX (US)

( * ) Notice: Subject to any disclaimer, the term of this patent is extended or adjusted under 35 U.S.C. 154(b) by 127 days.

(21) Appl. No.: 15/728,665

(22) Filed: Oct. 10, 2017

(65) Prior Publication Data

US 2018/0098546 A1   Apr. 12, 2018

Related U.S. Application Data

(60) Provisional application No. 62/406,288, filed on Oct. 10, 2016.

(51) Int. Cl.
*A21C 5/00* (2006.01)
*A21C 9/04* (2006.01)
*B65G 47/04* (2006.01)
*A21C 9/08* (2006.01)
*A21C 13/00* (2006.01)

(52) U.S. Cl.
CPC .............. *A21C 5/003* (2013.01); *A21C 9/04* (2013.01); *A21C 9/085* (2013.01); *B65G 47/04* (2013.01); *A21C 13/00* (2013.01)

(58) Field of Classification Search
CPC ........... A21C 5/003; A21C 9/04; A21C 13/00; B65G 47/04
See application file for complete search history.

(56) References Cited

U.S. PATENT DOCUMENTS

| | | | | |
|---|---|---|---|---|
| 2,693,236 A | * | 11/1954 | Kuts | B26D 3/003 83/264 |
| 3,347,183 A | * | 10/1967 | Einstein | A21C 5/00 425/90 |
| 3,479,024 A | * | 11/1969 | Miller et al. | B65B 35/54 270/52.09 |
| 3,494,990 A | * | 2/1970 | Balint | B21H 1/18 264/71 |
| 3,521,578 A | * | 7/1970 | Fraioli, Sr. | A21C 7/01 425/94 |
| 3,543,694 A | * | 12/1970 | Carre | A21B 5/03 99/335 |
| 3,661,243 A | * | 5/1972 | Piatek | B65B 35/54 198/475.1 |

(Continued)

*Primary Examiner* — Steven N Leff
(74) *Attorney, Agent, or Firm* — Kirby Drake

(57) ABSTRACT

A product multiplying system or a multiplier may divide a product into a plurality of units and may increase a number of units of the product that may be released into a receptacle. The product multiplying system or a multiplier may increase the number of units of the product by a factor of two and may not jam the products. The product multiplying system or a multiplier may match a rate of cuts per minute of a first divider and a second divider. A first set and a second set of a plurality of diagonal channels may guide the product toward a center discharge guide and toward an outside discharge guide, respectively. Additionally, the product may be divided and rounded prior to being transferred to the multiplier where the product may be dusted.

6 Claims, 6 Drawing Sheets

(56) References Cited

U.S. PATENT DOCUMENTS

| | | | | | |
|---|---|---|---|---|---|
| 3,887,719 | A | * | 6/1975 | Miller | A01J 25/114 |
| | | | | | 426/517 |
| 4,045,151 | A | * | 8/1977 | Zazzara | A21C 7/01 |
| | | | | | 425/297 |
| 4,057,377 | A | * | 11/1977 | Sakurazawa | A21C 3/02 |
| | | | | | 425/135 |
| 4,244,460 | A | * | 1/1981 | Groundwater | B65B 23/14 |
| | | | | | 198/429 |
| 4,913,043 | A | * | 4/1990 | Cheung | A21C 9/063 |
| | | | | | 425/110 |
| 5,060,562 | A | * | 10/1991 | Florindez | A21C 9/081 |
| | | | | | 221/266 |
| 5,402,715 | A | * | 4/1995 | Kurachi | A23L 7/109 |
| | | | | | 99/450.2 |
| 6,199,346 | B1 | * | 3/2001 | Ahad | A01J 27/045 |
| | | | | | 426/517 |
| 6,612,213 | B1 | * | 9/2003 | Bredenberg | B65H 29/40 |
| | | | | | 271/300 |
| 2012/0258226 | A1 | * | 10/2012 | Lindgren | F28F 3/12 |
| | | | | | 426/517 |
| 2014/0072667 | A1 | * | 3/2014 | Meade | A21C 7/00 |
| | | | | | 425/333 |

\* cited by examiner

PRODUCT MULTIPLYING SYSTEM AND METHOD OF MULTIPLYING A PRODUCT

CROSS REFERENCE TO RELATED APPLICATION

The application claims the benefit under 35 U.S.C. § 119(e) of U.S. Provisional Patent Application Ser. No. 62/406,288 filed on Oct. 10, 2016, entitled "Product Multiplying System," which is incorporated by reference in its entirety.

TECHNICAL FIELD

The disclosure relates generally to a product multiplying system. In particular, the disclosure relates to a multiplier that may multiply by a factor of two, converting two consecutive rows, or groups, of equal number of pieces into one row containing the sum of the two initial groups. The product that may be output by food production equipment.

BACKGROUND

Standard food production equipment can provide a divider that can include one, two, four, six, eight, or ten ports; a rounder bed; and a multiplier. A product, such as balls of dough, can be divided and rounded before being transferred to the multiplier. While the multiplier can group a quantity of dough balls, these groupings can jam or clog equipment and release damaged product onto a tray proofer.

SUMMARY

Embodiments of the present disclosure generally provide a product multiplying system that may include a multiplier that may provide a forward motion for transporting a plurality of products. The multiplier may be arranged to prevent the plurality of products from jamming the product multiplying system. The product multiplying system may further include a first divider that may be provided to divide a first product of the plurality of products into a first plurality of pieces at a first rate of cuts per minute. The product multiplying system may include a second divider that may be provided to divide a second product of the plurality of products into a second plurality of pieces at a second rate of cuts per minute. The second rate of cuts per minute may be approximately equivalent to the first rate of cuts per minute. The multiplier may group the first plurality of pieces and the second pluralities of pieces into a single row. The first rate of cuts per minute and the second rate of cuts per minute may be adjustable by a user. The product multiplying system may also include a first position of a first plurality of channels that may be provided on a surface of a rotating member. The product multiplying system may also include a second position of a second plurality of channels that may be provided on an opposite side of the rotating member. The multiplier may be arranged to be retrofit into other equipment.

Other embodiments of the present disclosure provide a multiplier roller that may be provided to group a product into a plurality of pieces. The multiplier roller may include a first position of a plurality of channels that may be arranged on a surface of the multiplier roller, and a second position of the plurality of channels opposite the first position that may be arranged on the surface of the multiplier roller. The multiplier roller may multiply the product and may group an output of the product. The multiplier roller may group the output of the product by a factor of approximately two and may be capable of processing the product at a rate of approximately 140 cuts per minute. The multiplier roller may be arranged to be retrofit into other equipment and may provide a speed of rotation that may be adjustable by a user. The multiplier roller may prevent the plurality of pieces from jamming the multiplier roller.

Embodiments of the present disclosure may provide a method of multiplying and grouping a product that may prevent the product from jamming equipment. The method may provide a step of releasing the product in a timed and sequential manner using a servomotor or an air motor rotary gate. The method may provide a step of guiding the product down the servomotor or the air motor. The method may provide the step of positioning a first plurality of channels and a second plurality of channels approximately 180 degrees apart on roller surface. The product may be guided in different directions toward the air motor rotary gate as a roller advances forward along the roller surface. The method may provide the step of advancing the roller forward in a stepwise motion at approximately 180 degrees per step. The method may provide the step of guiding the product to the air motor rotary gate, and the air motor rotary gate may be driven by the servomotor. The method may provide the step of multiplying and grouping an output of the product by a factor of two before the rotary gate may deliver the product to a tray proofer or a pan. The method may provide the steps of dusting the product after the output of the product is multiplied and grouped, and depositing the output of the product onto the tray proofer or the pan.

Other technical features may be readily apparent to one skilled in the art from the following drawings, descriptions and claims.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

Embodiments of the present disclosure generally may provide a product multiplying system in which a multiplier may provide an increase in a rate of dividing a product and may increase a number of units of the product that may be released into a receptacle.

Figure 1:
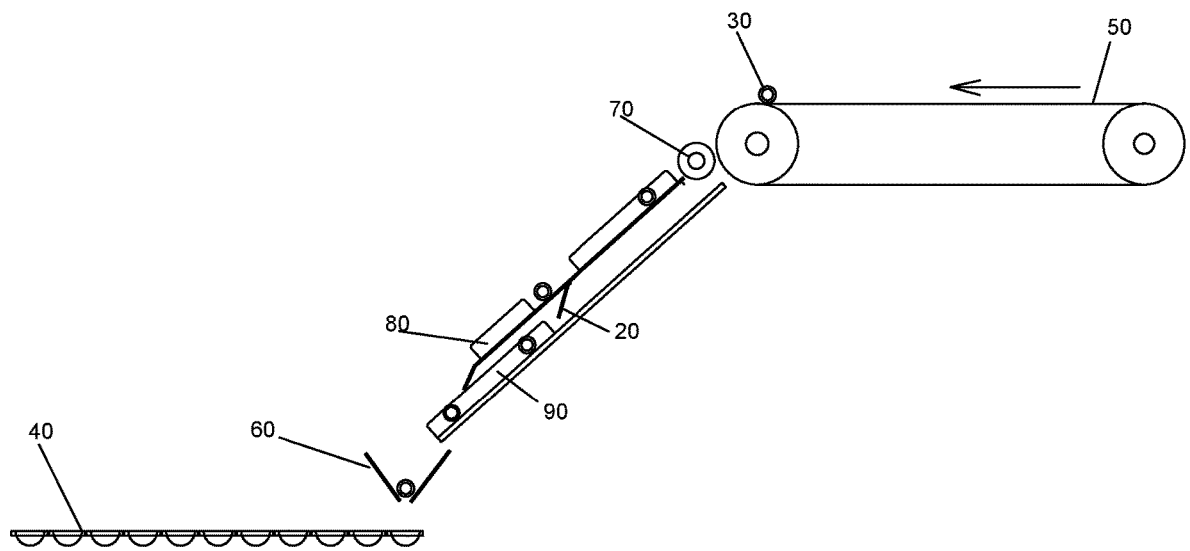
FIG. 1 is a side view of a standard dough multiplier apparatus according to prior art.

FIG. 1 depicts standard dough multiplier apparatus 100 according to prior art. A multi-port divider and rounder bed conveyor or belt 50 can divide and round product 30, respectively, before transferring product 30 to standard dough multiplier 100. Multiplier 100 can provide plurality of guide lanes 60 in a zigzag arrangement in which product 30 can be transferred from rounder bed conveyor or belt 50 and downstream to additional food processing equipment that can further process product 30.

According to the prior art as shown in FIG. 1, product 30 can be a first group of product that may contain six dough balls transferred from an end of rounder bed conveyor or belt 50 to zigzag board 80. The first group can be stopped by vertical gate 20 that can be momentary and can immediately guide the first group along a path to a center of a top section of zigzag board 80. The first group can be further guided toward bottom end 90 of zigzag board 80 and can be deposited onto closed gate 60, which may be a Bombay-gate. Gate 60 can remain closed until a second group which can contain multiple dough balls, can be transferred, and can be temporarily stopped in a timed manner to match a rate of cuts per minute of the divider for the first group. The second group can be guided toward gate 60 and can drop to bottom section 90 of zigzag board 80 while gate 60 is in a closed position. Gate 60 can be arranged to open and close vertically, the first and second groups of product can form a single line, and the product can finally fall onto moving tray-proofer 40 when gate 60 is opened.

Figure 2A:
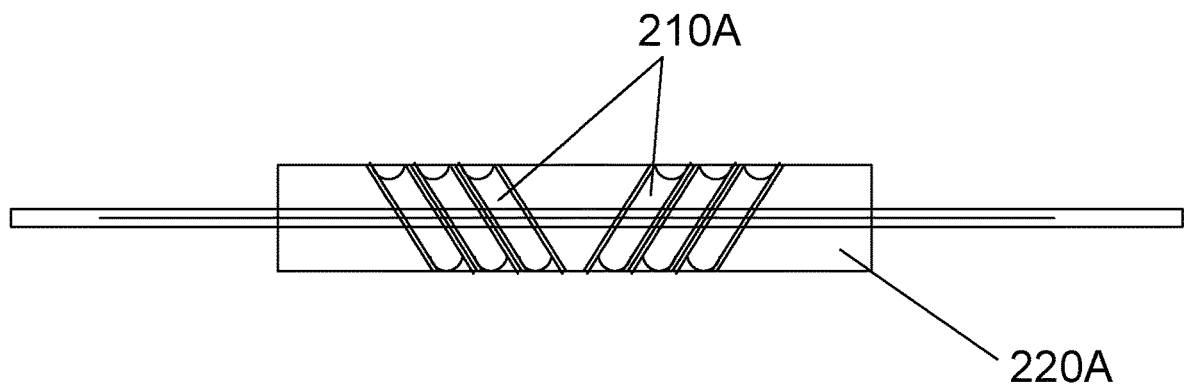
FIG. 2A is a view of a first position of a diverter gate according to an embodiment of the present disclosure.
Figure 3:
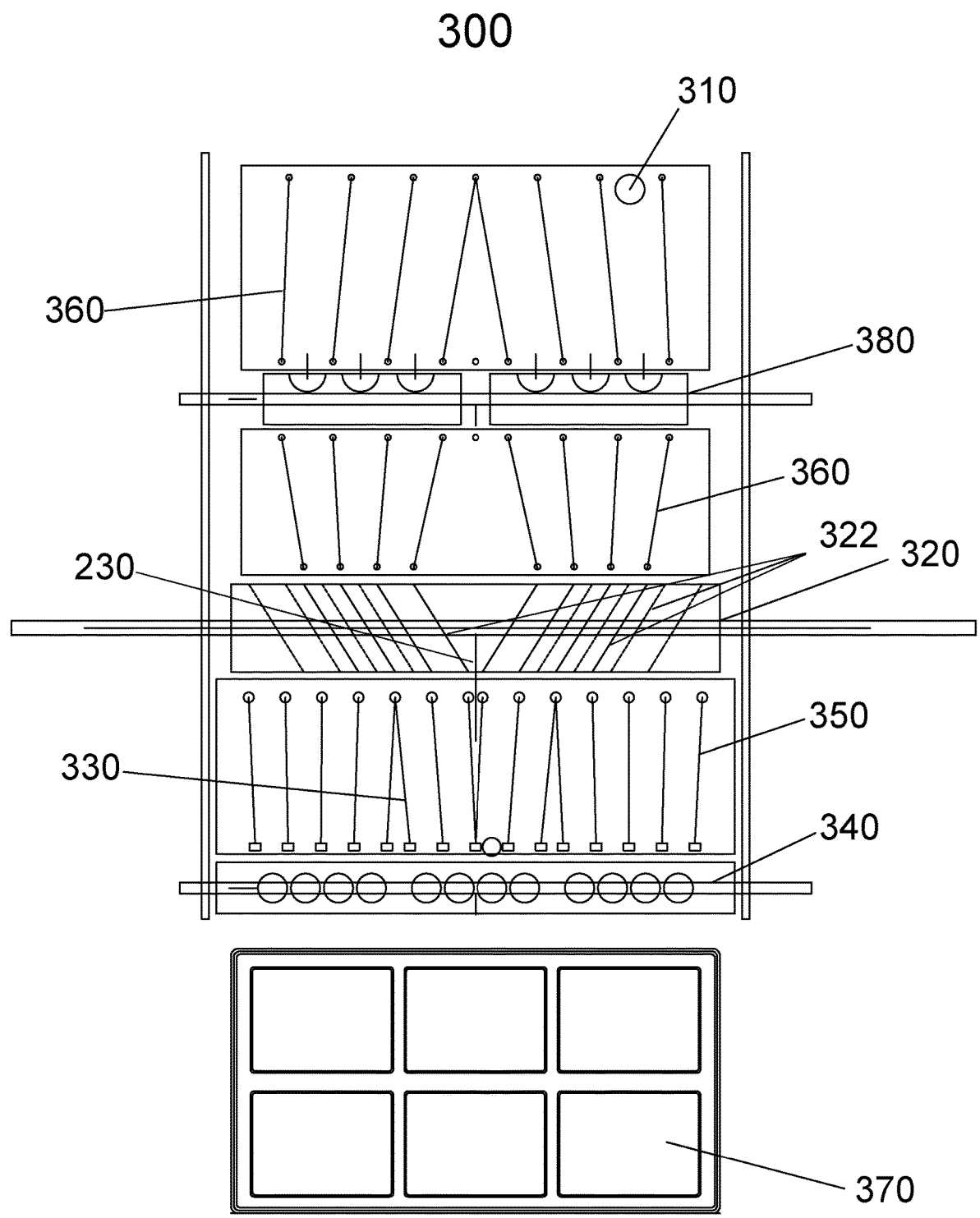
FIG. 3 is a view of a multi-stage system arranged to feed product according to an embodiment of the present disclosure.
Figure 4:
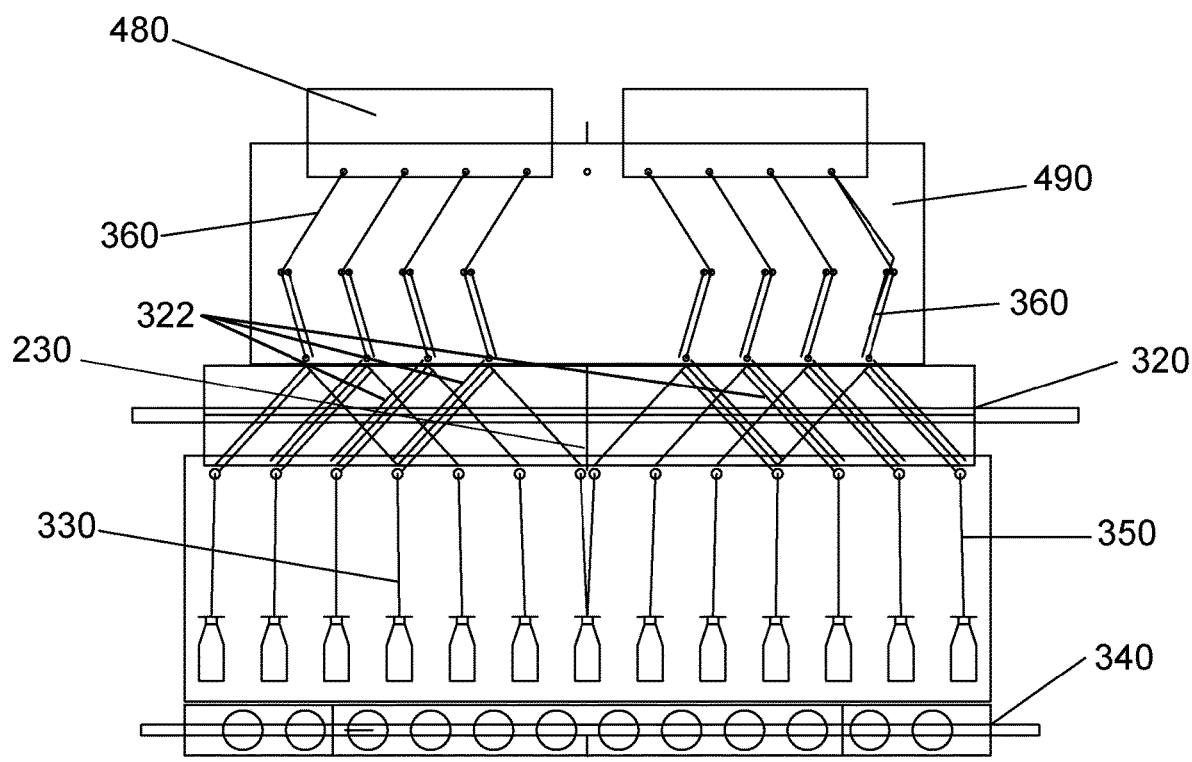
FIG. 4 is a front view of a multi-stage system arranged to guide product according to an embodiment of the present disclosure.
Figure 5:
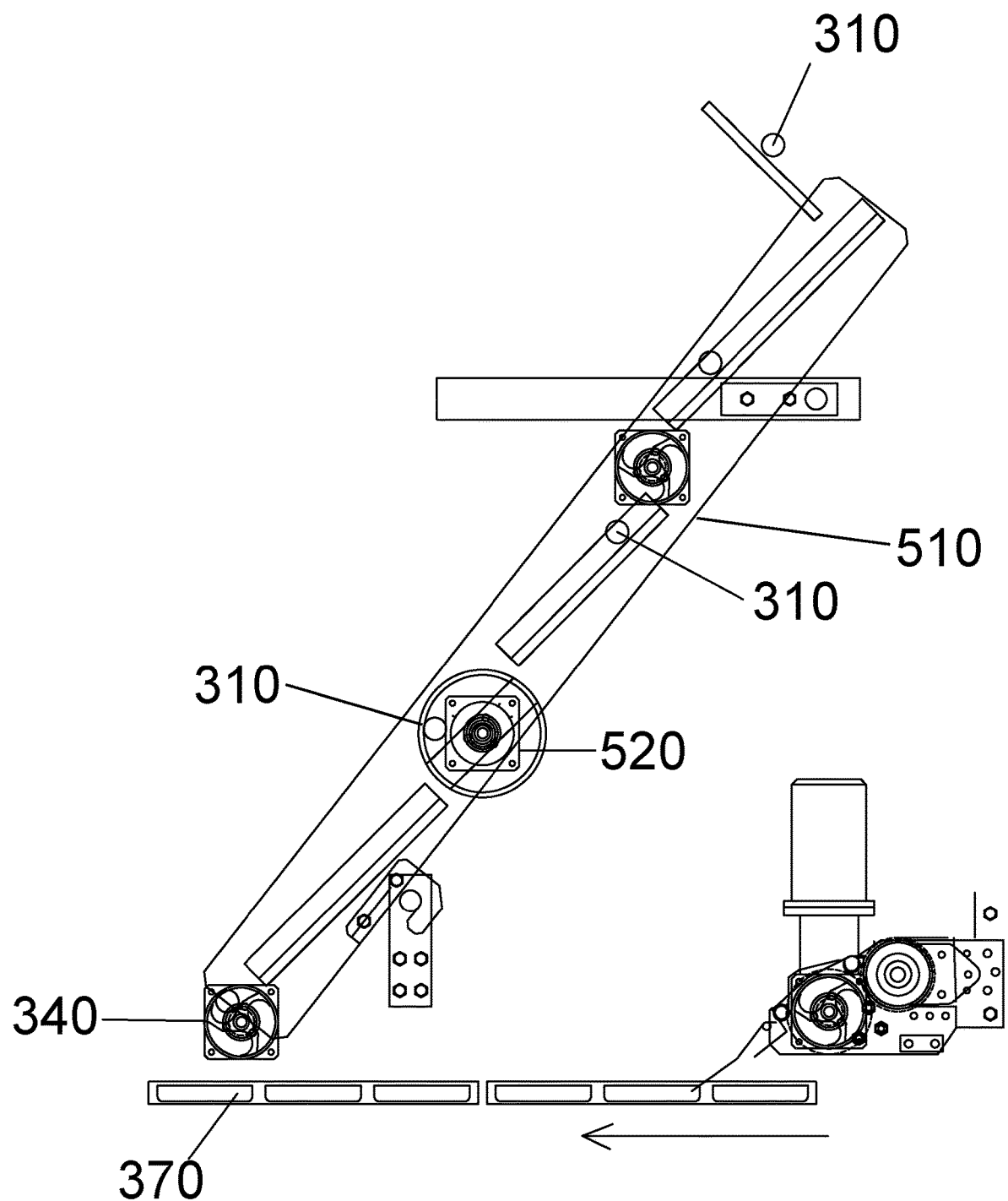
FIG. 5 is a side view of a multi-stage system provided to feed product.

FIG. 2A depicts first position (A position) 200A of plurality of channels 210A in diverter gate 220A of multiplier 300, 400, 500 (FIGS. 3-5) according to an embodiment of the present disclosure. In first position 200A, plurality of channels 210A may be diagonal and may be arranged to angle toward center of top feed 230 (FIGS. 3-4). Plurality of channels 210A may angle downward and may provide a plurality of passageways in which product 310 (FIGS. 3-5) may travel toward gate 340 (FIGS. 4-6). Plurality of channels 210A may be built into a multiplier servo driven roller. It should be appreciated that plurality of channels 210A may be six channels in an embodiment of the present disclosure; however, more or fewer channels may be provided without departing from the present disclosure. It should be appreciated that a quantity of plurality of channels 210A may match a quantity of product 310 (FIGS. 3-5), such as dough balls and/or floured dough balls, that may be grouped by multiplier 300, 400, and 500 (FIGS. 3-5). A first quantity of four, six, eight, and/or ten of product 310 may be aligned and diverted toward center of top feed 230 (FIGS. 3-4) or discharge guide 330 (FIGS. 4-6) at approximately a 180-degree turn/cycle.

Figure 2B:
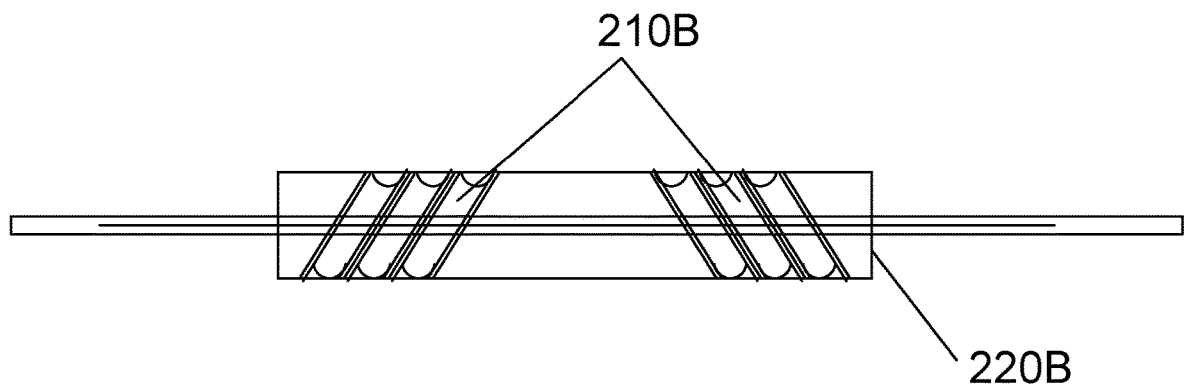
FIG. 2B is a view of a second position of a diverter gate according to an embodiment of the present disclosure.

FIG. 2B depicts second position (B position) 200B of plurality of channels 210B that may be arranged along a top feed of a device according to an embodiment of the present disclosure. In second position 200B, plurality of channels 210B may be diagonal and may be arranged to angle away from center 230 of top feed (FIGS. 3 and 4). Plurality of channels 210B may angle downward and may provide a plurality of passageways in which product 310 (FIGS. 3-5) may travel toward gate 340 (FIGS. 4-6). It should be appreciated that plurality of channels 210B may be six channels in an embodiment of the present disclosure; however, more or fewer channels may be provided without departing from the present disclosure. A second quantity of four, six, eight, and/or ten of product 310 (FIGS. 3-5) may correspond to the first quantity of product 310 and may be aligned and diverted toward gate 340 (FIGS. 4-6) or outside discharge dough guide(s) 350 (FIGS. 3 and 5) of multiplier 300, 400, 500 (FIGS. 3-5). It should be appreciated that outside discharge dough guide(s) 350 (FIGS. 3 and 4) may be arranged horizontally from left to right. Plurality of channels 210B may be arranged in the first position, and the plurality of channels may be arranged in the second position and may operate to output product 310 (FIGS. 3-5) of a set of dough balls that may double an initial quantity of dough balls. The dough balls may be transported through final rotary gate 340 (FIGS. 4-6) and may be deposited onto a baking cardboard box or steel tray that may be provided by receptacle 370. It should be appreciated that product 310 may be fed from a proofer tray (not shown) to receptacle 370 (FIGS. 3-4) according to an embodiment of the present disclosure. The proofer tray may hold product 310 for a brief period of time in which product 310 may stabilize and may be discharged into receptacle 370. It should be appreciated that receptacle 370 (FIGS. 3-4) may be provided in the form of cardboard boxes on a steel pan in an embodiment of the present disclosure; however, other receptacles may be utilized without departing from the present disclosure.

FIGS. 3-4 depict multi-stage product multiplying system or multiplier 300 (FIG. 3), 400 (FIG. 4) according to an embodiment of the present disclosure. System 300, 400 may provide an improved number of cuts per minute of product 310 (FIG. 3) compared to conventional food production equipment. System 300, 400 may increase the row size of product 310 by a factor of approximately two when product 310 is deposited into system 300, 400 from rounder bed conveyor or belt 480 (FIG. 4). Plurality of guide lanes 360 may feed product 310 to rotary gate 340, and rotary gate 340 may be provided to release product 310. Additional guide lanes 360 may be provided above diverter gate 320 to feed product 310 to diverter gate 320. Diverter gate 320 may provide plurality of channels 322 that may be angled toward center of top feed 230. Product 310 may be fed through plurality of channels 322 to rotary gate 340 and may be guided by discharge guide 330 and outside discharge guide 350. Product 310 may be deposited into receptacle or tray proofer 370 from gate 340. It should be appreciated that product 310 may have a spherical shape. It should be appreciated that product 310 may include, but is not limited to, bakery buns, muffins, dough, and pre-floured dusted dough balls. It should also be appreciated that an end product may include, but is not limited to, baked goods, such as bakery buns and English muffins. It should be appreciated that multi-stage product multiplying system 300, 400 may provide a first stage that may include 6-pocket divider 490 in an embodiment of the present disclosure; however, more or fewer pockets may be provided without departing from the present disclosure. The first stage may provide three steps that may include releasing the product in a timed and sequential manner by rotary gate 340, guiding product 310 down six-pocket divider 490, and guiding product 310 to rotary gate 340 that may be driven by a servomotor (not shown).

FIG. 5 depicts multi-stage product multiplying system 500 according to an embodiment of the present disclosure. Multi-stage product multiplying system 500 may provide 2-step roller divider 510, 520, first channel divider 510 including a first position of a plurality of channels along a top feed, and second channel divider 520 including a second position of a plurality channels along a top feed of a device. It should be appreciated that product 310 may be divided and rounded prior to being transferred to multiplying system 500 in embodiments of the present disclosure. It should further be appreciated that 310 product may be dusted, such as with flour, in multiplying system 500 in some embodiments of the present disclosure. It should be appreciated that channel dividers 510, 520 may include any quantity of channels without departing from the present disclosure. It should be appreciated that channel dividers 510, 520 may include a quantity of six channels in an embodiment of the present disclosure; however, more or fewer channels may be provided without departing from the present disclosure. Product 310 may be fed from rounder belt conveyor 480 (FIG. 4) according to an embodiment of the present disclosure. A first group of product may be fed through first multi-channel divider 510 including a first position, and a second group of product may be fed through second multi-channel divider 520 including a second position according to embodiments of the present disclosure. In an embodiment of the present disclosure, the multi-channel dividers may be 6-channel dividers; however, more or fewer channels may be provided without departing from the present disclosure. In the first position, plurality of channels 322 (FIGS. 3 and 4) and diverter gate 320 may be arranged to angle toward center of top feed 230. Plurality of channels 322 (FIGS. 3 and 4) may angle downward and may provide a plurality of passageways in which product 310 may travel toward rotary gate 340. It should be appreciated that in the second position, plurality of channels 322 may be arranged to angle away from center of top feed 230. Plurality of channels 322 may angle downward and may provide a plurality of passageways in which a product may travel toward rotary gate 340. It should be appreciated that multiplying system 500 may provide, in a sequential and timed manner, the second group of product that may be divided to match a number of cuts per minute of the first group of product. It should be appreciated that the first and second groups of product 310 may include a quantity of units that may correspond to a quantity of channels in multi-channel dividers 510, 520, respectively. It should be appreciated that the product may be dough or dough balls, such as for English muffins, in embodiments of the present disclosure.

It should be appreciated that as a first group of product 310 may be transferred from rounder bed conveyor 480 (FIG. 4) or rounder belt to zigzag board (not shown), the first group of product 310 may be stopped by rotary gate 340. Servo motor (not shown) may be driving rotary gate 340, and product 310 may be released in a sequential and timed manner to match a rate of cuts per minute of the divider. The first group of product 310 may be provided in a first row and may be released by rotary gate 340. Product 310 may be guided down to a top edge of plurality of channels 322 that may be arranged in a first position. Plurality of channels 322 may be carved in a diagonal arrangement onto a roller or diverter gate 320. Roller or diverter gate 320 may provide two steps or two ranges of motion that may provide approximately 180 degrees of rotation in an embodiment of the present disclosure. Roller or diverter gate 320 may provide a rotary multiplier that may be driven by a servo motor and may guide the first quantity, which, in this embodiment, may contain six dough balls, through plurality of channels 322 that may direct toward a center of the zigzag board. Plurality of channels 322 may be arranged to guide product 310 or dough balls, and a servo motor of rotary gate 340 may be provided to drive rotary gate 340 at a bottom area of a zigzag board area.

It should be appreciated that a second group of product 310 may be formed from the first group that may be released from rotary gate 340 that may be guided down to a multiplier roller or diverter gate 320 to a top position according to embodiments of the present disclosure. The first and second groups of product 310 may be provided in the form of dough balls. The second group of dough balls may be guided by plurality of channels 322 that may be direct product 310 or dough balls toward an outside area of the zigzag board. The second group of dough balls may be guided toward a bottom of the board toward the rotary gate 340 and may be driven by a servo motor to complete dispensing product 310 or a plurality of dough balls. It should be appreciated that product 310 or the plurality of dough balls may be the first group of dough balls plus the second group of dough balls. It should be appreciated that any quantity of dough balls may be dispensed without departing from the present disclosure. It should be appreciated that the plurality of dough balls may include a quantity of twelve, when the first and second groups of dough balls include quantities of six, in an embodiment of the present disclosure; however, more or fewer dough balls may be provided without departing from the present disclosure. The dough balls may be deposited onto a tray proofer 4 or a bakery pan 16. It should be appreciated that the balls may be deposited onto any container or surface without departing from the present disclosure. It should be appreciated that a maximum number of cuts per minute may be approximately 140 cuts in embodiments of the present disclosure; however, fewer cuts per minute may be provided without departing from the present disclosure. It should further be appreciated that a quantity of approximately 70 balls may be provided which may be an optimal number of units in embodiments of the present disclosure; however, more or fewer balls may be provided without departing from the present disclosure.

It should be appreciated that a timer may be provided that may follow a clock and may control a sequence that may determine a rate of dough balls that may be produced according to some embodiments of the present disclosure. A human machine interface (HMI) control may be provided and may provide a means for creating a recipe according to some embodiments of the present disclosure. Options may be provided to change a speed of drives within the system and/or to change a rotation of a servo motor within the system according to some embodiments of the present disclosure. Roller may be called gates and may be driven by a servo motor according to some embodiments of the present disclosure. The servo motor may be accessible by a touch screen and may provide an angle of motion according to some embodiments of the present disclosure. It should be appreciated that an operator may control functions of the system, and inertia may be important according to some embodiments of the present disclosure. After a dough ball may be released into a receptacle, inertia and weight of a dough ball may control motion according to some embodiments of the present disclosure.

It should be appreciated that the multiplier may be retrofit into other applications and/or equipment. It should be appreciated the multiplier may provide the advantage of a faster system that may move dough balls in a forward motion. It should be appreciated that the multiplier may operate at a faster speed of rotation due to the forward motion of the product that may be multiplied, and the forward motion may avoid the product jamming in the multiplier. It should further be appreciated that dough balls may touch one another, and flour may be dispensed over the balls in some embodiments of the present disclosure. It should be appreciated that the multiplier may be sized depending on the application and may deposit dough balls onto trays in embodiments of the present disclosure.

It should be appreciated that the multiplier according to embodiments of the present disclosure may provide more product that may be deposited onto trays than substandard processing equipment or the dough multiplier described in the prior art. It should further be appreciated that the multiplier according to embodiments of the present disclosure may reduce an amount of time that may be required to divide product.

It may be advantageous to set forth definitions of certain words and phrases used in this patent document. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A rounded product multiplying system, comprising:
   a rotary gate that releases the rounded product in a timed and sequential manner:
   a multiplier having a first roller divider having a roller surface including a first plurality of channels and a second roller divider having a roller surface including a second plurality of channels, the first plurality of channels and the second plurality of channels positioned approximately 180 degrees apart, wherein the rounded product is guided in different directions toward the rotary gate as the first roller divider and the second roller divider advance forward along the respective roller surfaces, the first roller divider and the second roller divider advancing forward in a stepwise motion at approximately 180 degrees per step.

2. The product multiplying system of claim 1
   wherein the first roller divider divides a first set of rounded product into a first plurality of pieces at a first rate of cuts per minute; and
   wherein the second roller divider divides a second set of rounded product into a second plurality of pieces at a second rate of cuts per minute.

3. The product multiplying system of claim 2, wherein the second rate of cuts per minute is approximately equivalent to the first rate of cuts per minute.

4. The product multiplying system of claim 2, wherein the multiplier groups the first plurality of pieces and the second pluralities of pieces into a single row.

5. The product multiplying system of claim 1, wherein the first rate of cuts per minute and the second rate of cuts per minute are adjustable by a user.

6. The product multiplying system of claim 1, wherein the multiplier is arranged to be retrofit into other equipment.

* * * * *